(12) United States Patent
Heidemann et al.

(10) Patent No.: US 6,431,782 B1
(45) Date of Patent: Aug. 13, 2002

(54) CORROSION-PROTECTED AGGREGATE AND METHOD FOR PRODUCING SUCH A COMPONENT

(75) Inventors: Manfred Heidemann, Belm-Vehrte; Jürgen von Garrel, Damme, both of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/646,738
(22) PCT Filed: Jan. 14, 2000
(86) PCT No.: PCT/DE00/00124
§ 371 (c)(1),
(2), (4) Date: Nov. 13, 2000
(87) PCT Pub. No.: WO00/43252
PCT Pub. Date: Jul. 27, 2000

(30) Foreign Application Priority Data

Jan. 21, 1999 (DE) .......................... 199 02 361

(51) Int. Cl.$^7$ .......................... F16C 11/00; F16J 15/16
(52) U.S. Cl. .......................... 403/122; 403/51; 403/50; 277/635; 277/634; 277/630
(58) Field of Search .......................... 403/50, 51, 122, 403/134; 277/630, 634, 635

(56) References Cited

U.S. PATENT DOCUMENTS

| | | | | |
|---|---|---|---|---|
| 3,129,023 A | * | 4/1964 | Fierstine .................. | 403/122 |
| 3,262,706 A | * | 7/1966 | Hassan .................. | 464/134 X |
| 3,292,957 A | * | 12/1966 | Ulderup .................. | 403/134 |
| 3,322,445 A | * | 5/1967 | Hassan .................. | 403/51 |
| 3,343,855 A | * | 9/1967 | Husen .................. | 403/51 |
| 3,822,100 A | * | 7/1974 | Reinsma et al. .................. | 403/134 |
| 4,722,404 A | * | 2/1988 | Evans .................. | 277/336 X |
| 5,092,704 A | | 3/1992 | Buhl et al. .................. | 403/134 |
| 5,312,200 A | | 5/1994 | Buhl et al. .................. | 403/134 |

FOREIGN PATENT DOCUMENTS

| | | | | |
|---|---|---|---|---|
| DE | 3705847 A1 | * | 9/1988 | |
| GB | 949966 A | * | 11/1960 | |
| NR | 210762 A | * | 8/1960 | .................. 403/122 |

* cited by examiner

Primary Examiner—Lynne H Browne
Assistant Examiner—Ernesto Garcia
(74) Attorney, Agent, or Firm—McGlew and Tuttle, P.C.

(57) ABSTRACT

A corrosion-protected modular unit is disclosed with two components, of which a first metallic component exhibits a socket opening, into which a second component is capable of being inserted at least partially, and the second component is endowed with a sealing element which interacts via an abutment face with the surface of the first component. An anticorrosive element (5) is applied in firmly adherent manner on the surface of the first component between the abutment face (1) of the sealing element (2) and the surface (3) of the first component (4). The process includes the application of a surface-protection layer on the first metallic component (4), machining of a surface region (3.1) of the surface (3) of the first component (4), insertion of a mounting pin (10) into the socket opening (6) of the first component (4), adhesive bonding of the anticorrosive element (5) onto the prepared surface region (3.1) of the first component (4), with simultaneous positioning of the anticorrosive element (5), removal of the mounting pin (10), - insertion of the second component (7) into the socket opening (6) and subsequent fixation of said second component to the first component (4).

14 Claims, 3 Drawing Sheets

CORROSION-PROTECTED AGGREGATE AND METHOD FOR PRODUCING SUCH A COMPONENT

FIELD OF THE INVENTION

The invention relates to a corrosion-protected modular unit with two components, of which a first metallic component exhibits a socket opening, into which a second component is capable of being inserted at least partially, and the second component has a sealing element which interacts via an abutment face with the surface of the first component.

BACKGROUND OF THE INVENTION

Metallic components have to meet growing demands not only with regard to higher load-bearing capacity but also with regard to longer service life. To this end, anticorrosive measures in particular are of crucial importance. But it is a disadvantage that with increasing effort in respect of protection against corrosion the production costs also increase. In order to eliminate this disadvantage in obvious manner it is known from the modern automobile industry, for example, to provide metallic blanks with a coating, such as a lacquer film that is capable of providing protection against corrosion, before they are supplied to a further processing stage. However, disadvantages with respect to the tolerances of the components arise as a result of the application of a lacquer film of this type. Accordingly, in working procedures that are, in part, elaborate, the lacquer film subsequently has to be removed at contact-pairing points and from bores before a connection to other components can be made. By virtue of the remachining of the metallic components the lacquer film is partially removed, resulting once again in a surface of attack for corrosive media.

Another possibility for preventing the surface protection from totally covering the entire. component consists in machining, in advance, those parts of the component to be treated with surface protection, then in covering them, sealing them or closing them off with adhesive, in order finally to be able to apply the surface protection. In this case the covering is—for the most part—removed and cannot be used again. However, this known method is very elaborate and therefore cost-intensive

SUMMARY AND OBJECTS OF THE INVENTION

The technical problem underlying the invention is to create a modular unit comprising two components that enables optimal protection against corrosion with simple, cost effective means. In addition, a process for producing a corrosion-protected modular unit is also provided.

In accordance with the invention, a first metallic component exhibits a socket opening, into which a second component is capable of being inserted at least partially. For the purpose of sealing the components that are mobile relative to one another the second component is endowed with a sealing element. An abutment face which is formed on the sealing element interacts with the surface of the first component. According to the invention, the first component is a metallic blank which, for reasons of protection against corrosion, is simply and cost effectively coated with a lacquer film or is provided with a surface protection in another manner known as such. The necessity to abide by exact dimensional tolerances was complied with by a mechanical removal of the lacquer film or of the surface-treated regions being effected in respect of the first component. On this machined region a contact pairing with a second component is subsequently possible. The second component may, in turn, be composed of several individual parts. To the extent that they are mobile relative to one another, these parts should be protected by a sealing element against the penetration of corrosive media between the moving parts.

In accordance with the invention, it is proposed to apply an anticorrosive element onto the surface of the first component in firmly adherent manner between the abutment face of the sealing element and the surface of the first component.

In this connection, an adhesively bonded packing, washer or film may serve as anticorrosive element. Of course, the surface of the first component has to be freed of dust, grease and other impurities prior to connection to the anticorrosive element. Tie anticorrosive elements may be manufactured from a variety of materials, depending on the field of application of the components. The use of polyvinyl chloride (PVC) has proved to be particularly advantageous. This material is resistant to water and also to heat, cold, oil and grease. It exhibits advantageous flexibility over a wide range of application and, in addition, is outstandingly suitable for adhesion bonding. Furthermore, PVC is available in the form of self-adhesive film.

Since the mechanical erosion of the surface-treated region of the first component is carried out, for the most part, in relatively liberal manner, and since the anticorrosive element is to cover the surface-treated region completely, it follows that the abutment face of the sealing element has a smaller geometrical external dimension than the external dimension of the anticorrosive element. But this represents a certain excess length of the anticorrosive element beyond the abutment face of the sealing element. As a consequence of the pairing of materials for sealing element and anticorrosive element, a slide surface results which makes an additional sealing effect possible. Here a complementary profiling would even be conceivable, creating a type of labyrinth seal.

A special application according to the invention will be elucidated in the following on the basis of a modular wheel-carrier unit pertaining to a motor vehicle. The first component is the wheel-carrier of the motor vehicle 5 and the second component is the ball pivot of a ball-and-socket joint. The ball-and-socket joint consists, in turn, of a housing and a bearing bush which is received in the housing and in which the joint ball of a ball pivot which is supported so as to be universally mobile is inserted. A ball-and-socket joint of this type further exhibits a bellows-type seal by way of sealing element, which is in sealing contact, on the one hand, with the housing and, on the other hand, with the ball pivot and which consequently seals the components that are mobile relative to one another in relation to environmental influences. On the side facing towards the wheel-carrier the bellows-type seal is provided with an abutment face which interacts with the surface of the wheel-carrier. As a blank, the wheel-carrier is provided, in the manner previously described, with a surface protection which may consist of a lacquer coating, for example. Since the conical pivot region of the ball pivot of the ball-and-socket joint has to be inserted in accurately fitting manner in the socket of the wheel-carrier which is provided for it, prior to mounting of the ball pivot it is necessary to remove the extraneous substances which have inadvertently penetrated into the socket. In order to obtain an optimal sealing of the overall system it is furthermore necessary to machine the abutment face of the bellows-type seal on the wheel-carrier. The surface of the wheel-carrier must be plane, in order to achieve an optimal sealing effect. In accordance with the invention, an anticorrosive element is adhesively bonded onto this premachined surface of the wheel-carrier, the outside diameter of said anticorrosive element being larger than the abutment face of the bellowstype seal. In order to enable dimensionally accurate fixing of the anticorrosive element, firstly a mounting pin is inserted into the socket opening and subsequently the anticorrosive element is adhesively bonded onto the surface region of the wheel-carrier, with simultaneous positioning of the anticorrosive element. After the mounting pin has been removed, the ball pivot of the ball-and-socket joint can, be inserted into the socket which has been prepared for it and can be fixed to the wheel-carrier in a manner known as such, for example by means of a screwed connection. During the fastening of the ball pivot to the wheel-carrier the bellows-type seal undergoes a slight elastic deformation in the axial direction, so that it interacts, subject to elastic bias, with the surface of the wheelcarrier. Consequently an optimal sealing effect is obtained.

With a corrosion-protected modular unit according to the invention and with the process that has been developed for this purpose an optimal resistance to corrosion of two components that are to be sealed in relation to one another is obtained. Creep corrosion of the sealing element is totally prevented. As a consequence of the machining of the surfaces, areas of surface roughness can be avoided which would otherwise be favorable for creep corrosion. Overall, an increase in the service life of metallic components is obtained by this means. In addition, a cost effective variant has been discovered that also enables integration into series products that are already in production.

A preferred embodiment variant of a corrosion-protected modular unit according to the invention will be elucidated in greater detail in the following on the basis of the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
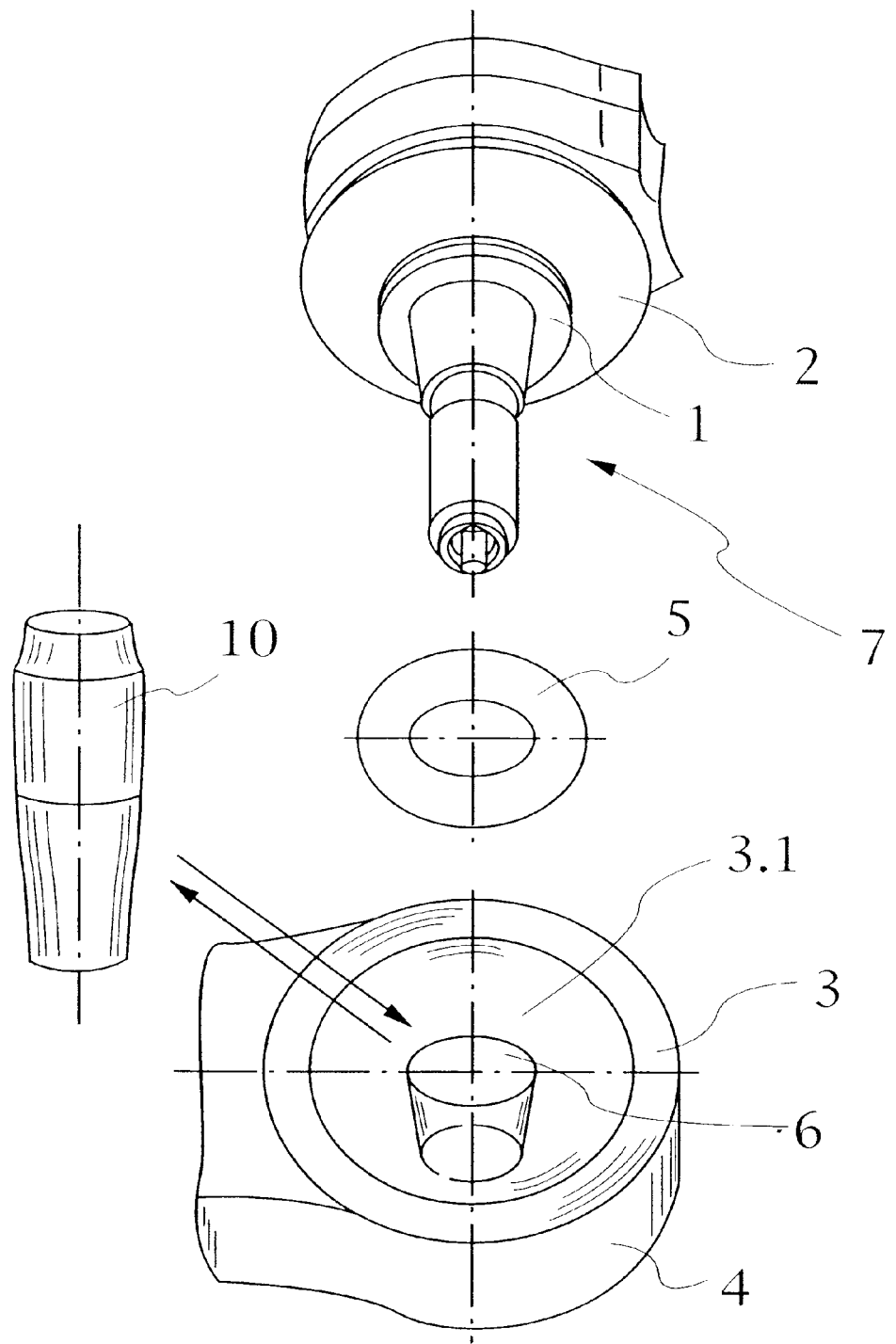
FIG. 1 is an exploded representation of an articulated linkage in a motor vehicle.
Figure 1:
Figure 2:
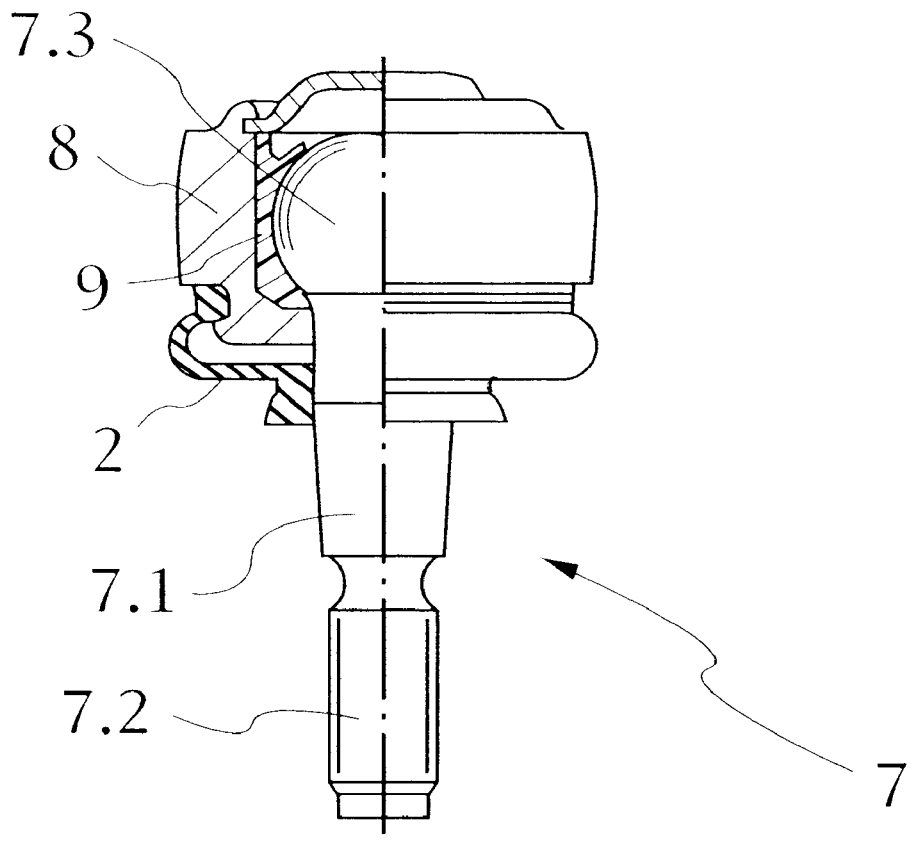
FIG. 2 is a ball-and-socket joint in partial section.
Figure 3:
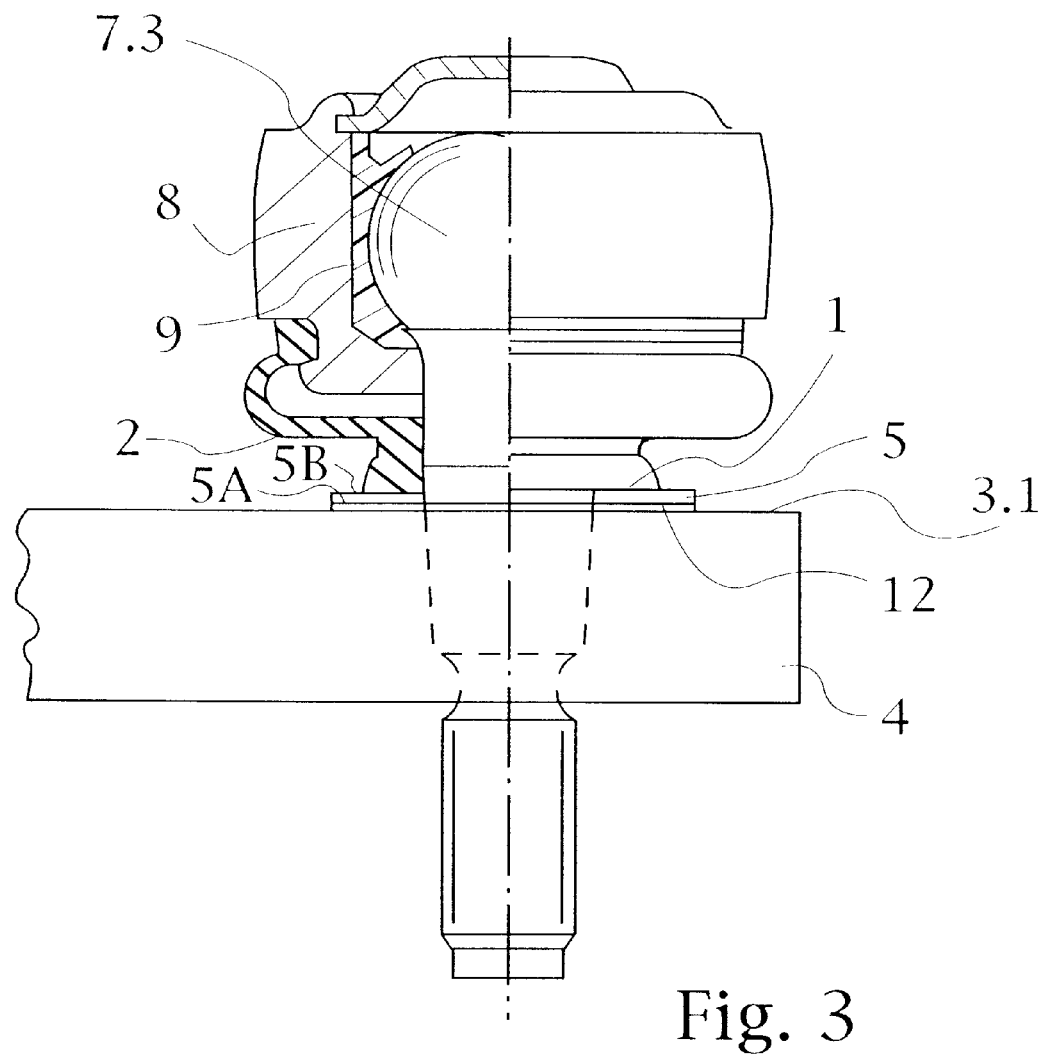
FIG. 3 is a partial section of the ball-and-socket joint in the wheel carrier.

Referring to the drawings in particular, the articulated linkage in the form of a wheel-carrier 4 such as finds application in motor vehicles is represented by way of an example of a corrosion protected modular unit comprising two components. This wheel-carrier 4 exhibits a socket opening 6 having a geometry that is complementary to the ball pivot 7 to be inserted into the socket opening 6. The ball pivot consists, in turn, of a conical region 7.1 and a threaded region 7.2 located on the end face of the conical region, The joint ball 7.3 of the ball pivot 7 is received in a bearing bush 9 so as to be universally mobile. The bearing bush is, in turn, inserted in a housing 8 of the ball-and-socket joint. For the purpose of sealing the components of the ball-and-socket joint that are mobile relative to one another, use is made of a sealing element 2 which in the present case is a bellows-type seal. This bellows-type seal 2 has an abutment face 1 on the side facing towards the wheel-carrier 4. This abutment face 1 of the bellowstype seal 2 comes to abut the surface region 3.1 of the surface 3 of the wheel-carrier 4 which has been freed of surface protection. In order to protect the surface region 3. 1 optimally against corrosive influences, in accordance with the invention an anticorrosive element 5 has a first side 5A adhesively bonded by adhesive 12 onto this surface region 3.1. With its conical region 7.1 the ball pivot penetrates both the opening of the bellows-type seal 2 and that of the anticorrosive element 5 and the socket opening 6 in the wheel-carrier 4. The threaded region 7,2 of the ball pivot 7 emerging below the wheel-carrier 4 is secured in position from the underside, of the wheel-carrier by means of a hexagonal nut 11.

In order to create a modular unit according to the invention as represented, the process steps itemized below are necessary: firstly, the wheel-carrier 4 is provided as a blank with a surface-protection layer. Then machining of the surface region 3.1 of the surface 3 and also, if need be, of the socket opening 6 is effected. Within the scope of this machining, impurities of every type are removed, necessitating a slight erosion of material. Amounting pin 10 is now inserted into the socket opening 6 of the wheelcarrier 4. This mounting pin 10 assists the positioning of the anticorrosive element 5 which is adhesively bonded onto the surface region 3.1 of the surface 3 of the wheel-carrier 4. After the application of the anticorrosive element 5 on the aforementioned surface, the mounting pin 10 is removed. Directly after this, mounting of the ball-and-socket joint is effected by the conical region 7.1 of the ball pivot 7 being passed through the socket opening 6 of the wheel-carrier and being fixed from the underside of the wheel-carrier 4 by means of the hexagonal nut 11. The bellows-type seal 2 undergoes a slight axial deformation during the fixing of the ball pivot 7, so that it presses elastically against the second side 5B of anticorrosive element 5 and hence against the surface region 3.1 of the wheel-carrier. In the process, the anticorrosive element 5 which is manufactured from PVC and the abutment face 1 of the bellows-type seal 2 form a sealing slide surface. The anticorrosive element 5 may consist, for example, of a film which is 0.05 mm to 0.08 mm thick and which is provided with an adhesive 12 on one side 5A or on both sides.

By way of adhesive, use may be made of solvent-based acrylate adhesives having high initial adhesion and final adhesion, for example a self-adhesive based on methyl acrylate. The advantage of PVC (white, transparent or frosted) consists in its strength and its resistance to a large number of mineral oils, greases, fuels, weak acids and aliphatic solvents, making this material outstandingly suitable for the automotive industry. It is resistant to any atmospheric influences, moisture, light, and is furthermore dimensionally stable over and beyond a long operational life-cycle. For the purpose of cleaning the surface region 3.1 of the wheel-carrier 4, use is made of grease-free solvents such as, for example, heptane, isopropyl alcohol or spirit.

While a specific embodiment of the invention has been shown and described in detail to illustrate the application of the principles of the invention, it will be understood that the invention may be embodied otherwise without departing from such principles.

What is claimed is:

1. A corrosion-protected modular unit comprising:
a first metallic component defining a socket opening;
a second component capable of being inserted at least partially into said socket opening, the second component having a sealing element with an abutment face interacting with a surface of the first component;
a firmly adherent anticorrosive element comprised of one of a packing, a washer or a film, said anticorrosive element having a first side adhesively bonded onto the surface of said first component and a second side diametrically opposite said first side, said anticorrosive element being arranged between said abutment face of said sealing element and said surface of said first component, said abutment face of said sealing element and said second side of said anticorrosive element form a slide surface.

2. A corrosion-protected modular unit according to claim 1, wherein the anticorrosive element has a material thickness of 0.05 to 0.08 mm and a layer of adhesive is applied onto the anticorrosive element on at least one side having a thickness of 0.01 to 0.03 mm.

3. A corrosion-protected modular unit according to claim 2, wherein the anticorrosive element comprises plastic.

4. A corrosion-protected modular unit according to claim 3, wherein the anticorrosive element comprises PVC.

5. A corrosion-protected modular unit according to claim 1, wherein a geometrical external dimension of said abutment face of said sealing element is smaller than an external dimension of said anticorrosive element.

6. A corrosion-protected modular unit according to claim 1, wherein said socket opening in the first component has a geometry that is complementary to the geometry of said second component.

7. A corrosion-protected modular unit comprising:
a first metallic component defining a socket opening, said first component being a wheel-carrier of a motor vehicle;
a second component capable of being inserted at least partially into said socket opening, the second component having a sealing element with an abutment face interacting with a surface of the first component, said second component being a ball pivot of a ball-and-socket joint;
a firmly adherent anticorrosive element comprised of one of a packing, a washer or a film, said anticorrosive element having a first side adhesively bonded onto the surface of said first component and a second side diametrically opposite said first side, said anticorrosive element being arranged between said abutment face of said sealing element and said surface of said first component, said abutment face of said sealing element and said second side of said anticorrosive element form a slide surface.

8. A corrosion-protected modular unit according to claim 7, wherein said ball-and-socket joint comprises a housing, a bearing bush which is received in said housing and a joint ball with said ball pivot supported so as to be universally mobile in said housing, and said sealing element being a bellows seal being in sealing contact, on one side with said housing and on another side with said ball pivot.

9. A corrosion-protected modular unit according to claim 8, wherein said ball pivot has a pivot neck which is conical at least in some regions and which is capable of being inserted into said socket opening and has a terminal threaded region thereon, said pivot neck passing completely through said wheeler and being fixed to said wheel-carrier by a hexagonal nut.

10. A corrosion-protected modular unit according to claim 9, wherein in a mounted of said ball-and-socket joint, said bellows type seal has an axial deformation so as to act indirectly, subject to elastic bias, against a surface of said wheel-carrier.

11. A process for producing a corrosion-protected modular unit with a first metallic component defining a socket opening, a second component capable of being inserted at least partially into said socket opening, the second component having a sealing element with an abutment face interacting with the surface of the first component, and a firmly adherent anticorrosive element comprised of one of a packing, a washer or a film, the process comprising the steps of:
machining a surface region of the surface of the first component;
inserting a mounting pin into the socket opening of the first component;
adhesive bonding of the anticorrosive element onto the surface region of the first component;
positioning the anticorrosive element during bonding;
removing the mounting pin;
inserting the second component into the socket opening and subsequently fixing the second component to the first component.

12. A process in accordance with claim 11, further comprising: applying a surface-protection layer on the first metallic component.

13. A corrosion-protected modular unit comprising:
a ball and socket joint including a ball pivot and a ball housing;
a sealing element arranged over a connection between said ball pivot and said ball housing, said sealing element including an abutment face;
a metallic carrier component defining a socket opening receivable of said ball pivot, said carrier component having a surface interacting with said abutment surface of said sealing element;
an anticorrosive element with a first side adhesively bonded onto said surface of said carrier component and a second side diametrically opposite said first side, said anticorrosive element being arranged between said abutment face of said sealing element and said surface of said carrier component;
said abutment face of said sealing element and said second side of said anticorrosive element form a slide connection.

14. The unit in accordance with claim 13, wherein: said abutment face of said sealing element and said second side of said anticorrosive element form a labyrinth seal.

* * * * *